Feb. 24, 1942. T. V. BUCKWALTER ET AL 2,274,187
ROLLER BEARING AXLE CONSTRUCTION
Filed Sept. 26, 1941 2 Sheets-Sheet 1
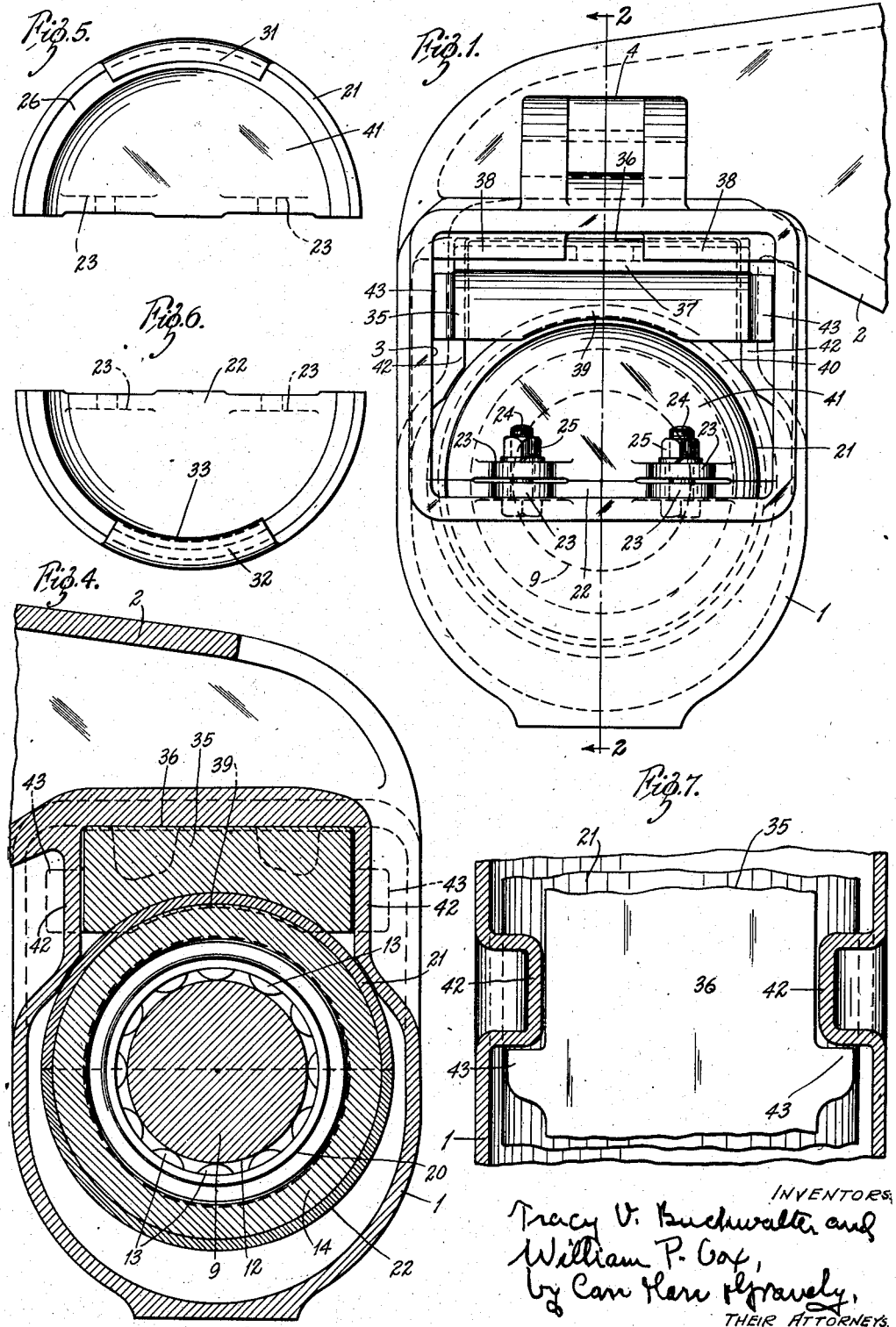

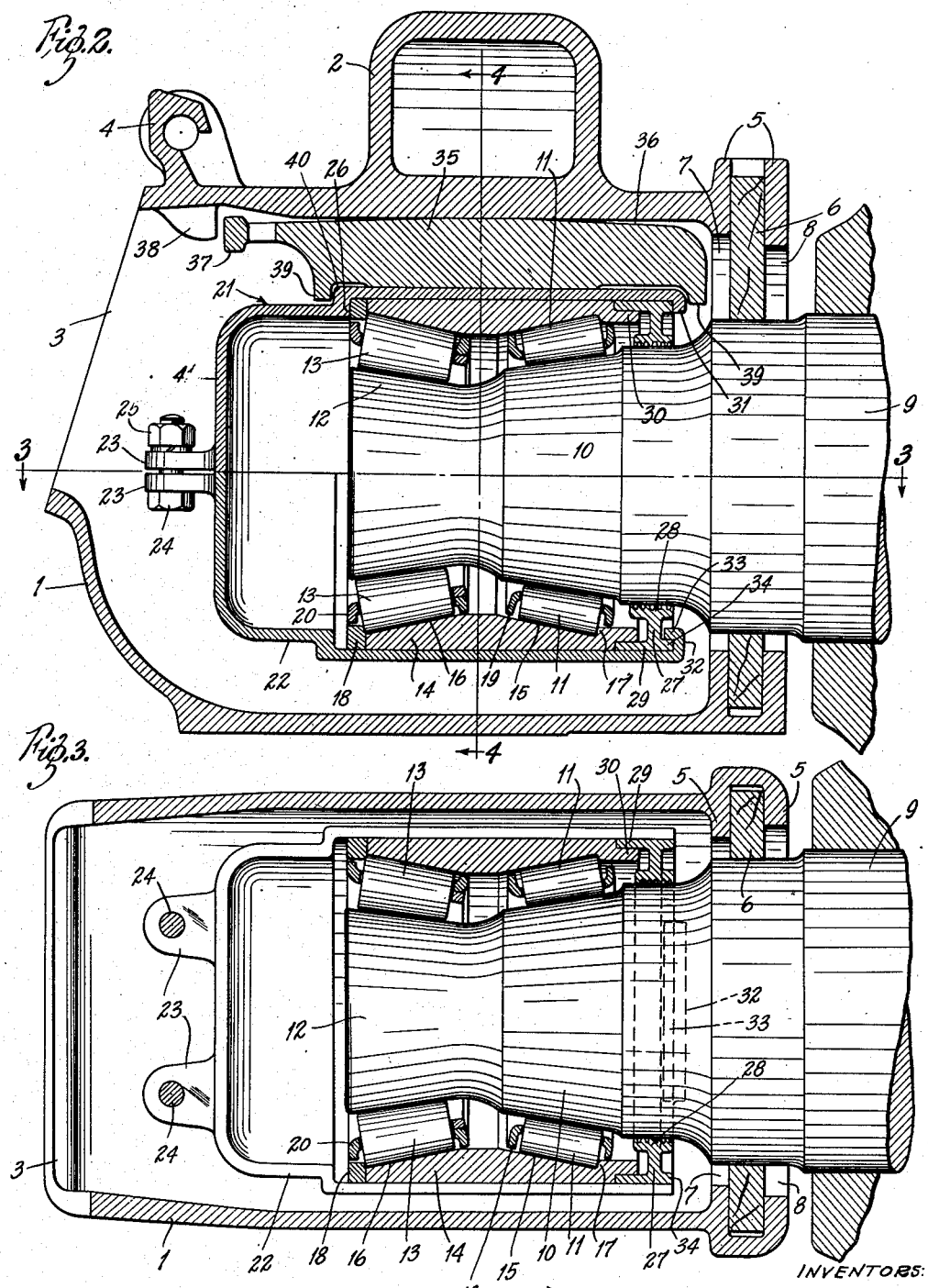

Patented Feb. 24, 1942

2,274,187

UNITED STATES PATENT OFFICE 2,274,187

ROLLER BEARING AXLE CONSTRUCTION

Tracy V. Buckwalter, Massillon, and William P. Cox, Canton, Ohio, assignors to The Timken Roller Bearing Company, Canton, Ohio, a corporation of Ohio Application September 26, 1941, Serial No. 412,354

5 Claims. (Cl. 308—180)

Our invention is an improvement in the type of axle shown in the application of William L. Scribner, Serial No. 316,922, filed February 2, 1940, for Roller bearing axle construction, wherein taper roller bearings are mounted in a journal box of standard A. A. R. construction. The invention has for its principal object to dispense with separate inner bearing members for both bearings of such construction, the axle itself being provided with two reversely tapered raceway portions for the bearing rollers. Further objects are to provide a housing for the bearings of such construction, to make the innermost series of bearing rollers self-contained with the bearing cup, to increase the strength of the axle and to simplify and improve the construction generally..

The invention consists principally in providing the axle itself with two reversely tapered raceway portions for tapered bearing rollers, in providing a split housing for the bearings and in making the innermost bearing rollers self-contained with the bearing cup. The invention further consists in the roller bearing axle construction and in the parts and combinations, and arrangements of parts hereinafter described and claimed.

In the accompanying drawings, wherein like reference characters indicate like parts wherever they occur, Fig. 1 is an end view of a roller bearing railway car axle construction embodying my invention, Fig. 2 is a sectional view on the line 2—2 in Fig. 1, Fig. 3 is a sectional view on the line 3—3 in Fig. 2, Fig. 4 is a vertical sectional view on the line 4—4 in Fig. 2, Fig. 5 is an inner end elevation of the upper half of the bearing housing, Fig. 6 is an inner end elevation of the lower half of said bearing housing; and Fig. 7 is a partial plan view of the bearing wedge member, with portions of the journal box shown in section.

In the drawings is illustrated a standard A. A. R. journal box 1 whose parts and dimensions conform to the standards established by the Association of American Railroads and whose upper portion is integral with a truck side frame member 2. The outermost end of the journal box is provided with an opening 3 which is normally covered by a suitable closure cap (not shown in the drawings), said cap being hingedly mounted on a lug 4 on the top of the journal box.

The innermost end of the journal box has spaced walls 5 to accommodate a sealing ring 6. These walls are provided with oval openings 7 and 8 through which extends the reduced end portion of an axle 9. The outermost or journal portion of said axle includes an outwardly tapering raceway portion 10 for an innermost series of tapered bearing rollers 11 and an outermost raceway portion 12 that tapers inwardly (that is, reversely to the taper of the innermost raceway 10) on which is mounted an outermost series of tapered bearing rollers 13. The raceway portions are preferably hardened by any suitable means or method. The outermost bearing rollers 13 are of larger diameter than the innermost rollers 11.

A double bearing cup 14 is provided with raceways 15 and 16 for cooperation with the two series of bearing rollers 11 and 13. Said cup is provided with an integral internal thrust rib 17 for the innermost series of bearing rollers 11 and with a separate thrust rib 18 for the outermost series of bearing rollers 13. The innermost rollers 11 are provided with a cage 19 disposed radially inward of the center line of the rollers, thereby making the rollers self-contained with the cup 14. The outermost rollers 13 provided with a cage 20 making a self-contained unit with the rollers 13 themselves.

Said double cup 14 is mounted in a bearing housing comprising an upper member 21 and a lower member 22 having projecting lugs 23 at their outermost ends that are secured together by bolts 24 and nuts 25. An internal shoulder 26 is provided in the upper housing member 21 to form a seat for the thrust rib 18. A closure ring 27 that has an inner grooved sleeve portion 28 sealing the axle has an outer sleeve portion 29 fitting over a reduced end portion 30 or rib on the bearing cup 14, the outside dimensions of said sleeve portion 29 being the same as the outside dimensions of the cup 14. The upper bearing housing member 21 has a downturned rib or lip 31 engaging the end of said closure member 27. The lower bearing housing member 22 has an upturned rib 32 at its innermost end with an inwardly bent lip 33 engaging the inner periphery of a rib 34 on the closure member 27.

A member 35 similar to the usual wedge of a plain bearing axle construction has its upper surface 36 convexly curved endwise and has a projecting outermost end portion 37 to cooperate with a pair of thrust lugs 38 in the top of the journal box. Said wedge member 35 is concavely curved transversely to fit said upper bearing housing 21. Said wedge 35 has downwardly projecting ribs 39 at the ends to cooperate with the innermost end of the upper bearing housing 21 and with a shoulder 40 formed by the reduced outer end 41 of said upper bearing housing 21.

The journal box 1 has an inwardly projecting boss 42 or lug near the top of each side and the wedge 35 has a lug 43 on each side, disposed outwardly of said journal box lugs 42 for cooperation therewith.

The above described construction has numerous advantages. Tapered bearing rollers may be used instead of the plain bearings ordinarily required in the standard A. A. R. journal box construction. Both rollers run directly on the axle, thereby eliminating the inner bearing member which is usually required and making a stronger axle construction. The bearing housing facilitates the lubrication of the bearing, since a smaller lubricant chamber is provided. When the bearings are to be removed, the bearing housing may be separated, and the lower bearing housing removed by releasing the securing lip. This will permit the removal of the upper bearing housing and the outermost series of bearing rollers, after which the bearing cup may be removed, carrying with it the innermost series of bearing rollers.

The largest diameter of the outermost raceway (at the outermost end of the axle) is smaller than the circle defined by the small ends of the innermost series of bearing rollers. Thus said innermost bearing rollers may be removed with the bearing cup, passing freely over the outermost end of the axle.

Obviously numerous changes may be made without departing from the invention and we do not wish to be limited to the precise construction shown.

What we claim is:

1. A car axle construction comprising an axle having a tapering raceway portion and a reversely tapering raceway portion adjacent thereto and outwardly thereof, a journal box into which said axle extends, tapered bearing rollers on said tapering raceway portions of said axle, a double bearing cup having raceways for the respective rollers, a bearing housing in which said bearing cup is mounted, and a wedge member interposed between said housing and the top of said journal box, said wedge having downwardly extending projections at its ends for cooperation with the ends of said housing, and said wedge and said journal box having cooperating lugs on their sides.

2. A car axle construction comprising an axle having a tapering raceway portion and a reversely tapering raceway portion adjacent thereto and outwardly thereof, a journal box into which said axle extends, tapered bearing rollers on said tapering raceway portions of said axle, a double bearing cup having raceways for the respective rollers, a closure ring secured to the innermost end of said bearing cup and sealing said axle, a bearing housing in which said bearing cup is mounted, said housing comprising upper and lower parts with meeting outer end portions secured together and forming a closure at the outermost end of the bearings and a wedge member interposed between said housing and the top of said journal box, said wedge having downwardly extending projections at its ends for cooperation with the ends of said housing, and said wedge and said journal box having cooperating lugs on their sides.

3. A car axle construction comprising an axle having a tapering raceway portion and a reversely tapering raceway portion adjacent thereto and outwardly thereof, a journal box into which said axle extends, tapered bearing rollers on said tapering raceway portions of said axle, a double bearing cup having raceways for the respective rollers, a closure ring on the innermost end of said cup sealing said axle, a bearing housing having upper and lower parts in which said bearing cup is mounted, the outermost ends of said housing parts being secured together and forming an outer end closure, said upper housing part having a rib overlapping said closure ring, said lower housing part having a rib and rebent lip overlapping and interengaging with said closure ring, and a wedge member interposed between said housing and the top of said journal box, said wedge having downwardly extending projections at its ends for cooperation with the ends of said upper housing parts, and said wedge and said journal box having cooperating lugs on their sides.

4. A car axle construction comprising an axle having a tapering raceway portion and a reversely tapering raceway portion adjacent thereto and outwardly thereof, a journal box into which said axle extends, tapered bearing rollers on said tapering raceway portions of said axle, a double bearing cup having raceways for the respective rollers, a separable thrust rib for the outermost rollers and a fixed thrust rib for the innermost rollers, a cage for the innermost series of rollers disposed radially inwardly of the outer lines of the rollers making them self-contained with said bearing cup, a bearing housing in which said bearing cup is mounted, said housing having upper and lower separable parts and a wedge member interposed between said housing and the top of said journal box, said wedge having downwardly extending projections at its ends for cooperation with the ends of said housing, and said wedge and said journal box having cooperating lugs on their sides.

5. A car axle construction comprising an axle having a tapering raceway portion and a reversely tapering raceway portion adjacent thereto and outwardly thereof, a journal box into which said axle extends, tapered bearing rollers on said raceway portions of said axle, a double bearing cup having raceways for the respective rollers, said cup having an integral internal thrust rib for the innermost rollers, a thrust rib for the outermost rollers mounted at the end of said cup, a closure ring at the innermost end of said bearing cup, a bearing housing having separable upper and lower parts in which said bearing cup is mounted, said upper housing part having an internal shoulder against which said separate thrust rib abuts, said lower housing part having an internal shoulder spaced outwardly beyond said shoulder in said upper part, said housing parts being secured together, said upper housing part having a downturned rib at its innermost end overlapping said closure ring, said lower housing part having an upturned rib and rebent lip overlapping and interengaging with said closure ring, and a wedge member interposed between said upper housing part and said journal box, said wedge having downwardly extending projections at its ends for cooperation with the ends of said upper housing part and said wedge and said journal box having cooperating lugs on their sides.

TRACY V. BUCKWALTER.
WILLIAM P. COX.